United States Patent
Garg et al.

(10) Patent No.: US 8,619,187 B2
(45) Date of Patent: Dec. 31, 2013

(54) CADENCE DETECTION IN PROGRESSIVE VIDEO

(75) Inventors: Sanjay Garg, Bangalore (IN); Nikhil Balram, Mountain View, CA (US); Mainak Biswas, Santa Cruz, CA (US); Vipin Namboodiri, Bangalore (IN)

(73) Assignee: Marvell World Trade Ltd (BB)

( * ) Notice: Subject to any disclaimer, the term of this patent is extended or adjusted under 35 U.S.C. 154(b) by 481 days.

(21) Appl. No.: 12/748,698

(22) Filed: Mar. 29, 2010

(65) Prior Publication Data

US 2010/0253838 A1   Oct. 7, 2010

Related U.S. Application Data

(60) Provisional application No. 61/165,612, filed on Apr. 1, 2009.

(51) Int. Cl.
| | |
|---|---|
| *H04N 7/01* | (2006.01) |
| *H04N 11/20* | (2006.01) |
| *H04N 3/36* | (2006.01) |
| *H04N 9/11* | (2006.01) |
| *H04N 5/14* | (2006.01) |
| *H04N 9/64* | (2006.01) |
| *G06K 9/00* | (2006.01) |

(52) U.S. Cl.
USPC ............. 348/441; 348/448; 348/452; 348/97; 348/701; 382/251

(58) Field of Classification Search
None
See application file for complete search history.

(56) References Cited

U.S. PATENT DOCUMENTS

| | | | |
|---|---|---|---|
| 4,579,455 A | 4/1986 | Levy et al. | |
| 6,058,140 A | 5/2000 | Smolenski | |
| 6,985,126 B2 | 1/2006 | Hoppenbrouwers et al. | |
| 2002/0171759 A1 | 11/2002 | Handjojo et al. | |
| 2003/0193486 A1 | 10/2003 | Estrop | |
| 2004/0252759 A1 | 12/2004 | John Winder et al. | |
| 2005/0002646 A1 | 1/2005 | Sato | |
| 2006/0007305 A1 | 1/2006 | Shah | |
| 2006/0146188 A1 | 7/2006 | Estrop | |
| 2006/0182357 A1 | 8/2006 | Liu et al. | |
| 2007/0024703 A1* | 2/2007 | Conklin | 348/97 |
| 2007/0171280 A1 | 7/2007 | Tian et al. | |
| 2008/0043154 A1 | 2/2008 | Tang et al. | |
| 2008/0088746 A1* | 4/2008 | Walls | 348/701 |
| 2008/0122973 A1* | 5/2008 | Iwasaki et al. | 348/448 |
| 2008/0151108 A1 | 6/2008 | Doswald | |
| 2008/0151109 A1 | 6/2008 | Doswald | |

(Continued)

FOREIGN PATENT DOCUMENTS

| | | | |
|---|---|---|---|
| EP | 1 198 137 A1 | 4/2002 | |
| EP | 1 592 247 A1 | 11/2005 | |

OTHER PUBLICATIONS

Patent Cooperation Treaty (PCT) International Search Report and Written Opinion in co-pending PCT International Patent Application No. PCT/US2010/029003, (International Filing Date Mar. 29, 2010), having a date of mailing of Aug. 18, 2010 (13 pgs).

(Continued)

*Primary Examiner* — Jefferey Harold
*Assistant Examiner* — Sean Haiem

(57) ABSTRACT

Devices, methods, and other embodiments associated with cadence detection are discussed. In one embodiment, an apparatus analyzes a progressive video stream and determines a cadence pattern from the progressive video stream.

20 Claims, 7 Drawing Sheets

(56) References Cited

U.S. PATENT DOCUMENTS

| | | |
|---|---|---|
| 2008/0158414 A1 | 7/2008 | Capps |
| 2008/0284908 A1 | 11/2008 | Chang |
| 2009/0016618 A1 | 1/2009 | Zhou |
| 2009/0148058 A1* | 6/2009 | Dane et al. .................... 382/251 |
| 2009/0161766 A1 | 6/2009 | Bronstein et al. |
| 2009/0185073 A1 | 7/2009 | MacInnis et al. |
| 2010/0149415 A1* | 6/2010 | Znamenskiy et al. ........ 348/448 |

OTHER PUBLICATIONS

US Patent and Trademark Office, Non-Final Office Action having a Notification Date of Dec. 29, 2011 in co-pending U.S. Appl. No. 12/499,932, filed Jul. 9, 2009.

United States Patent and Trademark Office (USPTO) Final Office Action in co-pending U.S. Appl. No. 12/499,932, filed Jul. 9, 2009, having a notification date of Jun. 28, 2012 (28 pgs).

* cited by examiner

US 8,619,187 B2

CADENCE DETECTION IN PROGRESSIVE VIDEO

CROSS REFERENCE TO RELATED APPLICATIONS

This application claims the benefit of U.S. provisional application Ser. No. 61/165,612, filed on Apr. 1, 2009, which is hereby incorporated by reference in its entirety.

BACKGROUND

Film movies are shot at a frame rate of 24 Hz (e.g. 24 frames-per-second fps). Although advanced digital televisions support 24 fps and can display movies natively, analog televisions and many digital televisions cannot. As a result, movie material is converted to either 30 interlaced frames (30i) or 60 progressive frames (60p) by display devices (e.g. DVD player or TV). To up-convert 24 Hz to 60 Hz, four progressive movie frames are converted to five interlaced frames or 10 progressive frames. The conversion process is known as "3:2 pulldown" or "2:3 pulldown."

During playback as video, the 60 Hz interlaced video stream is generated. When converting the film to interlaced video, each movie frame is turned into two or three video fields, which creates an uneven distribution of fields. In addition, a movie frame may get split into odd and even video fields where an odd field is the frame with only the odd pixel lines and an even field is the frame with only the even pixel lines. Typically, the odd and even video frames of an interlaced video are called fields.

Telecine is a term for converting movie content to TV/video form. Cadence correction is the restoration of the original frame sequence in video material. Cadence correction is commonly used to reverse the telecine process that converted movies shot on film into interlaced video back into the original 24 frames-per-second progressive film sequence. Cadence correction is part of deinterlacing, which in order to apply the appropriate algorithm, must determine if the original movie was shot with a film or video camera. It is also called cadence detection, film mode detection, reverse telecine, inverse telecine, and reverse 3:2 pulldown. Deinterlacers process interlaced video and convert the video to progressive form. Deinterlacers do not process input streams that are already in progressive form.

SUMMARY

In one embodiment, an apparatus comprises a frame motion detector that analyzes progressive frames and determines motion values between the progressive frames. A cadence detector determines a cadence pattern from the motion values of the analyzed progressive frames. A frame rate converter generates a different cadence based at least in part on the cadence pattern.

In another embodiment, a de-interlacer comprises motion detection logic analyzes an input video stream and determines a pattern of motion, the motion detection logic being re-configurable between: determining the pattern of motion between interlaced fields when the input video stream is an interlaced stream; and determining the pattern of motion between progressive frames when the input video stream is a progressive stream. The de-interlaces further includes a cadence detector that determines a cadence pattern from the pattern of motion. A converter converts the input video stream to a different cadence based at least in part on the cadence pattern.

In another embodiment, a method comprises analyzing a progressive video stream and comparing adjacent progressive frames and generating motion values between the adjacent progressive frames for a sequence of frames. The method then generates and stores cadence information that represents a cadence pattern of the progressive video stream determined from the motion values. The progressive video steam is then be converted to a stream having a different cadence based, at least in part, on the cadence information.

BRIEF DESCRIPTION OF THE DRAWINGS

The accompanying drawings, which are incorporated in and constitute a part of the specification, illustrate various methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of methods and other embodiments associated with cadence detection in progressive video. In one embodiment, the disclosure relates to video processing in a digital video format converter that detects film mode from progressive video inputs.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored in a memory or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
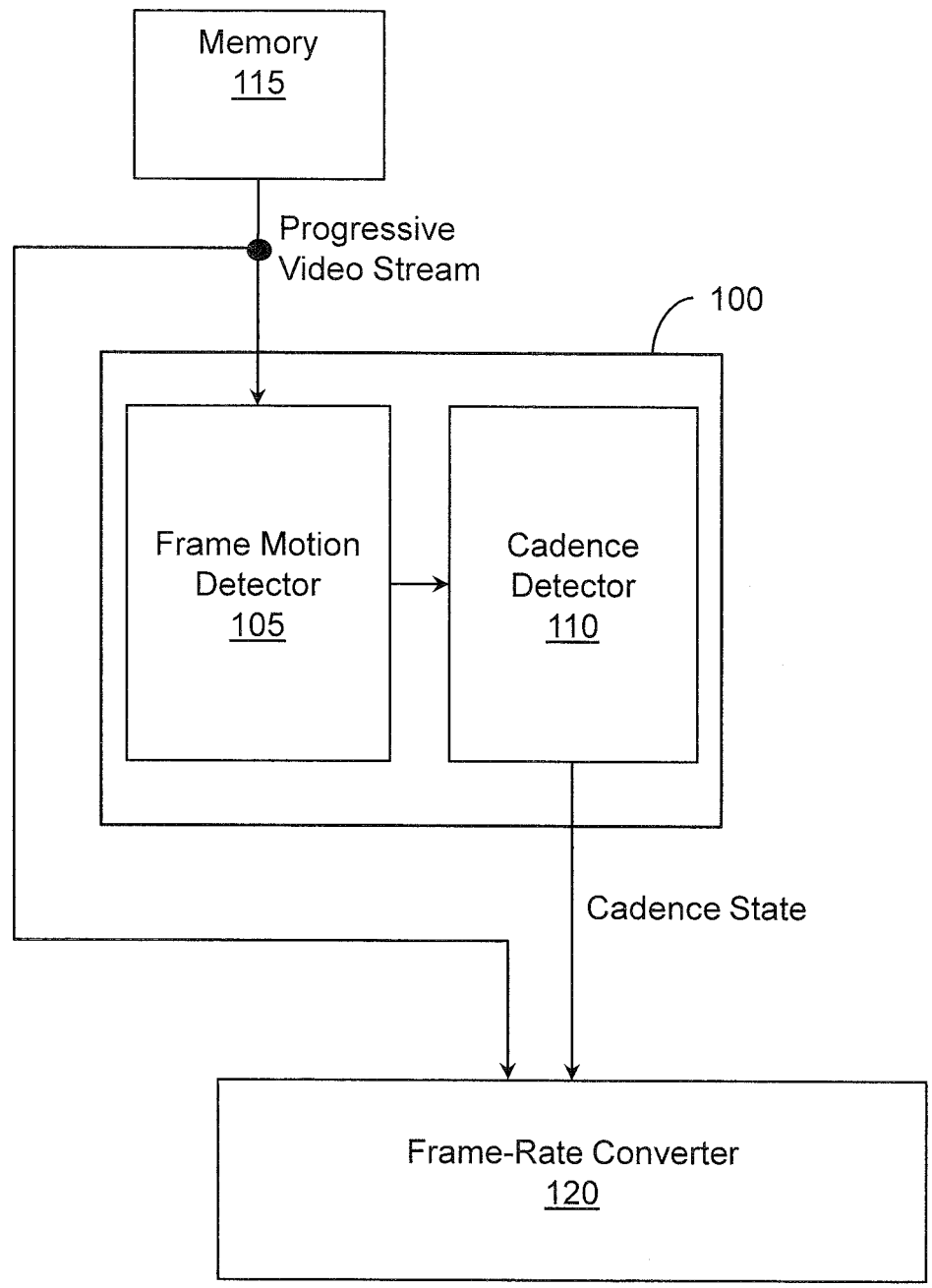
FIG. 1 illustrates one embodiment of an apparatus associated with cadence detection.

FIG. 1 illustrates one embodiment of an apparatus 100 that detects cadence in a progressive video stream. The apparatus 100 includes a frame motion detector 105 and a cadence detector 110. After the cadence is determined, the apparatus 100 generates cadence state information that is output to a frame-rate converter 120. For purposes of explanation, a 60 hz progressive (60p) input video stream will be discussed that contains a 3:2 pulldown cadence. It will be appreciated that other frame frequencies and cadence patterns can be used (e.g. 2:2, 2:3:3:2, 8:7, and so on).

The frame motion detector 105 receives the progressive video stream from a memory 115 or other source. The progressive video stream is formed of progressive frames (e.g. a 60 hz progressive video stream). The frame motion detector 105 analyzes the progressive video stream to generate motion values that represent motion between or across the progressive frames. The cadence detector 110 determines a cadence pattern from the motion values of the analyzed progressive frames and generates a cadence state sequence for the progressive video stream based, at least in part, on the cadence pattern. Generated values are stored in a memory. One example of motion values and a cadence state sequence is shown in Table 1 below.

TABLE 1

| 24p | A | | | B | | C | | | D | | E ... | |
|---|---|---|---|---|---|---|---|---|---|---|---|---|
| 60p | $A_1$ | $A_2$ | $A_3$ | $B_1$ | $B_2$ | $C_1$ | $C_2$ | $C_3$ | $D_1$ | $D_2$ | $E_1$ | E ... |
| Frame Motion | 0 | 0 | 1 | 0 | 1 | 0 | 0 | 1 | 0 | 1 | 0 | 0 |
| Cadence State | 4 | 0 | 1 | 2 | 3 | 4 | 0 | 1 | 2 | 3 | 4 | 0 |

In Table 1, "24p" is an original 24 Hz progressive frame stream. The letters "A", "B", "C" and so on represent different frames A, B, C, etc. "60p" is a 60 hz progressive frame stream. The 60p stream is generated from the 24p stream by up-converting to 60 Hz by 3:2 frame cadence. For example, frame A is repeated three times ($A_1$, $A_2$, $A_3$), frame B is repeated twice ($B_1$, $B_2$) and the pattern repeats.

When a video stream is received such as the 60p stream, the apparatus 100 processes the stream to identify the frames and the pattern of frames. This can be performed by detecting motion between two adjacent frames. If there is no motion between two adjacent frames, then the frames are declared as the same frame. If there is motion, then the frames are declared as different frames.

To detect motion between/across frames, the frame motion detector 105 compares each frame in the sequence with its neighboring right frame and generates a motion value for that frame. For example in Table 1, the frame motion value for frame A1 is determined by comparing frame $A_1$ with frame $A_2$. In Table 1, the frame motion value is "0", which indicates no motion and thus the frames are the same. A value of "1" indicates that the frames are different (e.g. $A_3$ compared to $B_1$ results in frame motion value "1").

In one embodiment, pixel values of frame $A_1$ are subtracted from pixel values from frame $A_2$. If the result is zero, the frames are identical. Non-identical frames can also be declared as the same frame if they are sufficiently similar. The frames are more likely dissimilar as the result from subtracting pixel values moves away from zero. To ensure more reliable determinations, a programmable threshold can be set to declare when a near zero value declares that two frames are the same. Motion can be detected using other methods, which are discussed in different embodiments herein.

The frame comparisons continue until enough motion values are obtained to reliably identify a cadence pattern. For the 3:2 pattern in Table 1, the motion values are "00101" and this pattern repeats. The cadence detector 110 is programmed with one or more cadence patterns that it is trying to match with the motion values of the input frame sequence. When a match is found, the cadence is determined. A 3:2 cadence has the pattern of "00101" and this matches the motion values in Table 1.

The cadence detector 110 then generates cadence state information that is provided to a frame-rate converter 120. The frame-rate converter 120 converts/inverts the 60p progressive stream to a desired film mode (e.g. 24p, smooth movie mode, and so on) thus recovering the cadence pattern. In a 3:2 cadence pattern, every fifth cadence state value is "0", which is represented in the cadence state sequence in Table 1. In general, the cadence state is a sequence that reflects how to identify the frames in a repeating cadence pattern. In the cadence state in Table 1, the "0" state is associated with the middle frame (e.g. $A_2$, $C_2$, $E_2$, etc) in the group of three duplicate frames (e.g. $A_1 A_2 A_3$, $C_1 C_2 C_3$, $E_1 E_2 E_3$). Since the 3:2 pattern includes five frames and then repeats, the cadence state is numbered for five frames (e.g. 0 to 4). With this starting point for the "0" state value, the other frames in the cadence pattern can be identified. For example at cadence state "2", it is known that the first frame of a two frame duplicate set is found (e.g. $B_1$ from $B_1 B_2$, or $D_1$ from $D_1 D_2$). Of course, different starting points for the "0" value can be used and different numbering schemes can be used. The frame-rate converter 120 uses the cadence state to determine which frames to add or drop to generate a smooth movie cadence (e.g. AB; AABB; AAABBB; etc). In one example, the smooth movie cadence is a balanced or uniformly repeating frame pattern where there is an equal number of each frame. For example, selecting a certain cadence state, frames at the selected state are added or dropped to generated smooth movie cadences from the original 3:2 sequence. Some examples may include: a) a frame is inserted at cadence state 3 to derive a 3:3 cadence (e.g. AAABB becomes AAABBB); b) a frame is dropped at cadence state 1 to derive 2:2 cadence (e.g. AAABB becomes AABB); or c) frames are dropped at cadence state 0, 2 and 4 to derive 24 Hz (e.g. $A_2 A_3 B_1 B_2 C_1$ becomes $A_3 B_2$). The selected cadence state is used to identify the correct position of the frame insert or drop in the progressive stream.

In another embodiment, motion between frames is detected by using pixel slices. For example, the frame motion detector 105 is configured to compare a progressive frame with an adjacent progressive frame by comparing pixel slices from the two frames. For example, for each frame, groups of pixel slices are defined throughout the frame (e.g. 100 pixels per slice). Motion vectors are determined between corresponding pixel slices and a histogram of motion values are generated from each slice from the motion vectors. Based at least in part on the histogram, a frame difference value is generated that indicates whether the current progressive frame is the same or different than the adjacent progressive frame. An example is shown in FIG. 2A.

Figure 2A:
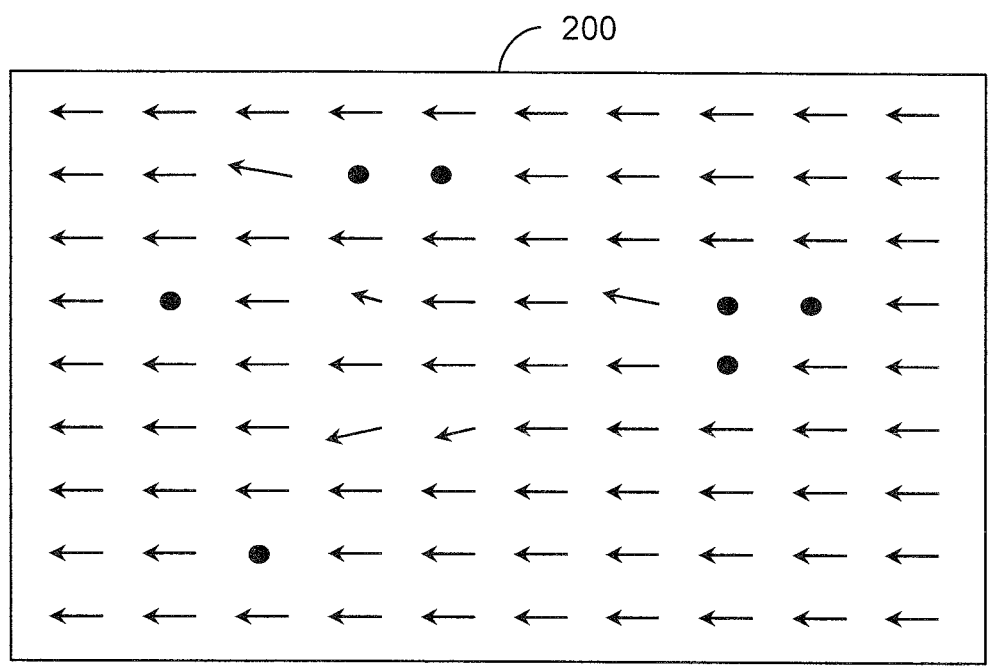
FIG. 2A illustrates an example of a motion map.

With reference to FIG. 2A, an example of a motion map 200 of motion vectors for a group of pixels is illustrated. In the map, the left-pointing arrows represent a right-to-left motion for a majority of the pixels. Solid dots represent no motion for that pixel from the current frame to the next. The motion map 200 may represent the motion between progressive frames $A_3$ and $B_1$ of Table 1, for example.

Figure 2B:
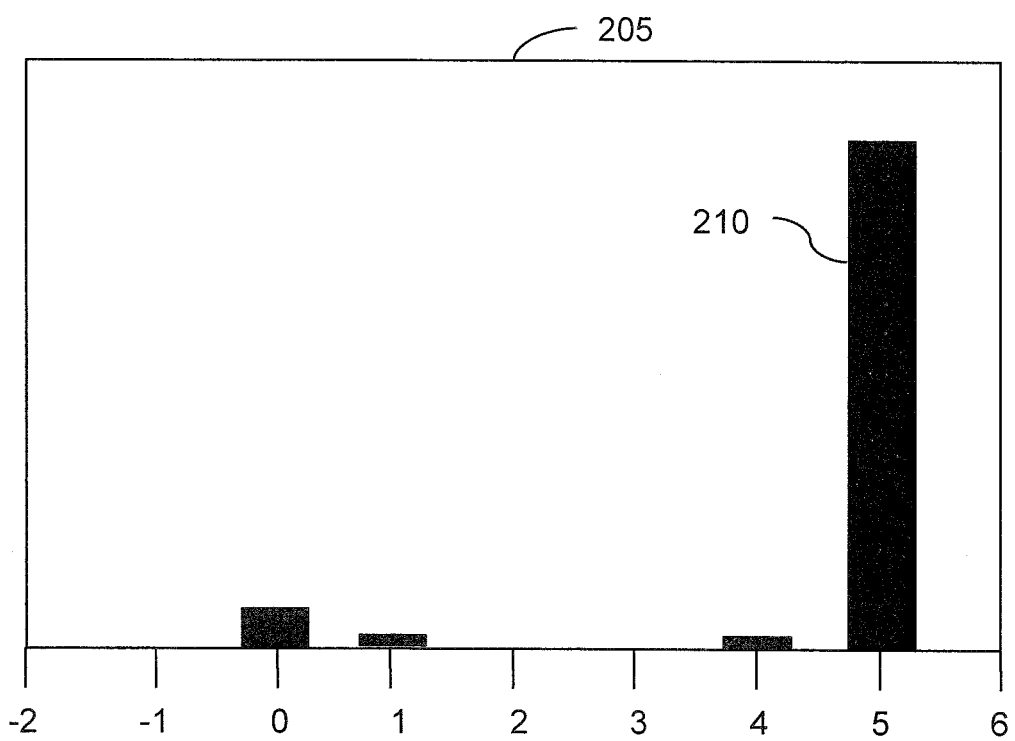
FIG. 2B illustrates an example of a histogram for the motion map of FIG. 2A.

The frame motion detector 105 generates a histogram from the motion vectors to determine amounts of motion across the particular group of pixels. FIG. 2B shows an example histogram 205 that may be generated from the motion vectors of map 200. The histogram x-axis values (e.g. −2, −1, 0 . . . 5, 6 . . . ) can represent the magnitude of the motion vector. The vertical axis represents the number of motion vectors found that had such pixel magnitudes. Thus, the largest histogram bar 210 located at the value of "5" would mean that, for the group of pixels in motion map 200, motion vectors with a magnitude of 5 were the most occurring vector. Smaller histogram bars are shown representing motion vectors in other directions (e.g. negative values) or motion vectors not representing any motion (e.g. "0" value). A motion value for the histogram can be generated and stored in a memory (e.g. 1 for motion or 0 for no motion). For example, if the number of motion vectors in a histogram meets or exceeds a threshold, motion is determined to exist.

Additional pixel slices and histograms are generated for other or all portions of the frame being analyzed. Once complete, the histogram information and the accumulated motion values are analyzed to determine if enough movement occurred between the two frames to declare the frames different otherwise the frames are declared the same. In one embodiment, a programmable threshold can be used to decide whether the frames are the same or different.

Figure 2C:
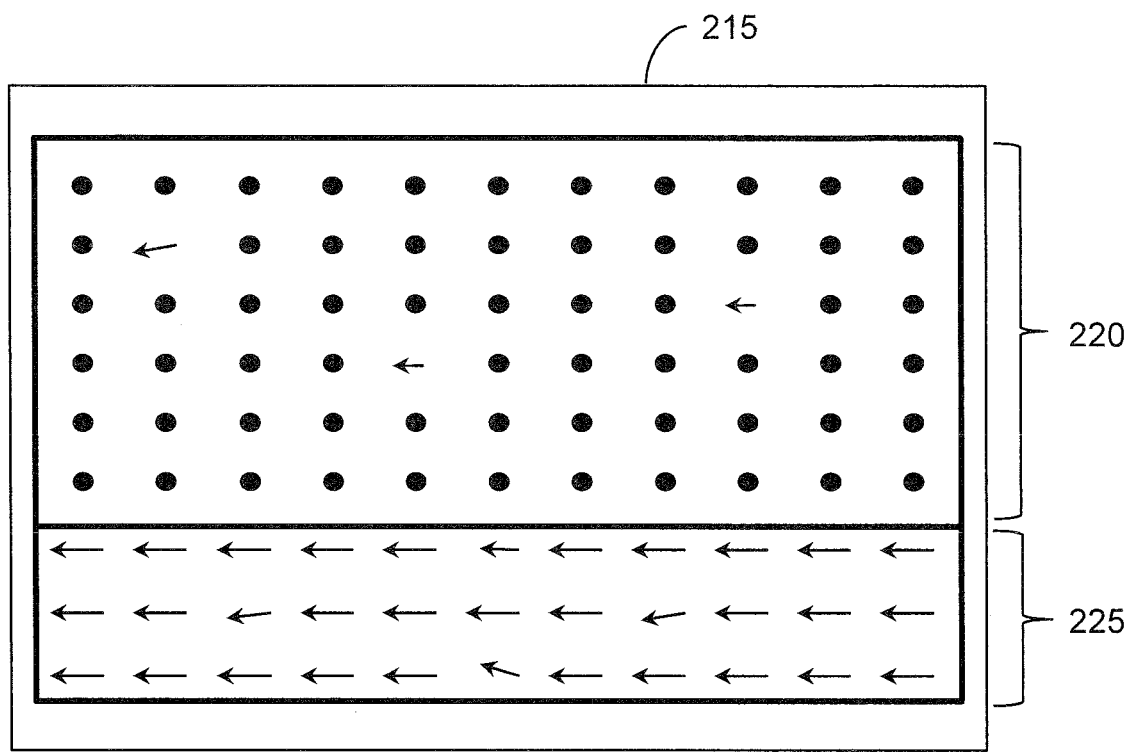
FIG. 2C illustrates another example of a motion map.

Using pixel slices to determine motion can also identify different types of content in a frame. For example, FIG. 2C illustrates a motion map 215 that shows motion vectors for a frame. In this example, the frame contains a superimposed video of scrolling text. Original frame content is shown as region 220 and the scrolling text is shown as region 225. The scrolling text can be scrolling news updates, scrolling stock information, or other type of superimposed moving announcement. As seen in FIG. 2C, region 220 includes mostly non-moving vectors (solid dots) while region 225 includes all moving vectors (arrows).

Figure 2D:
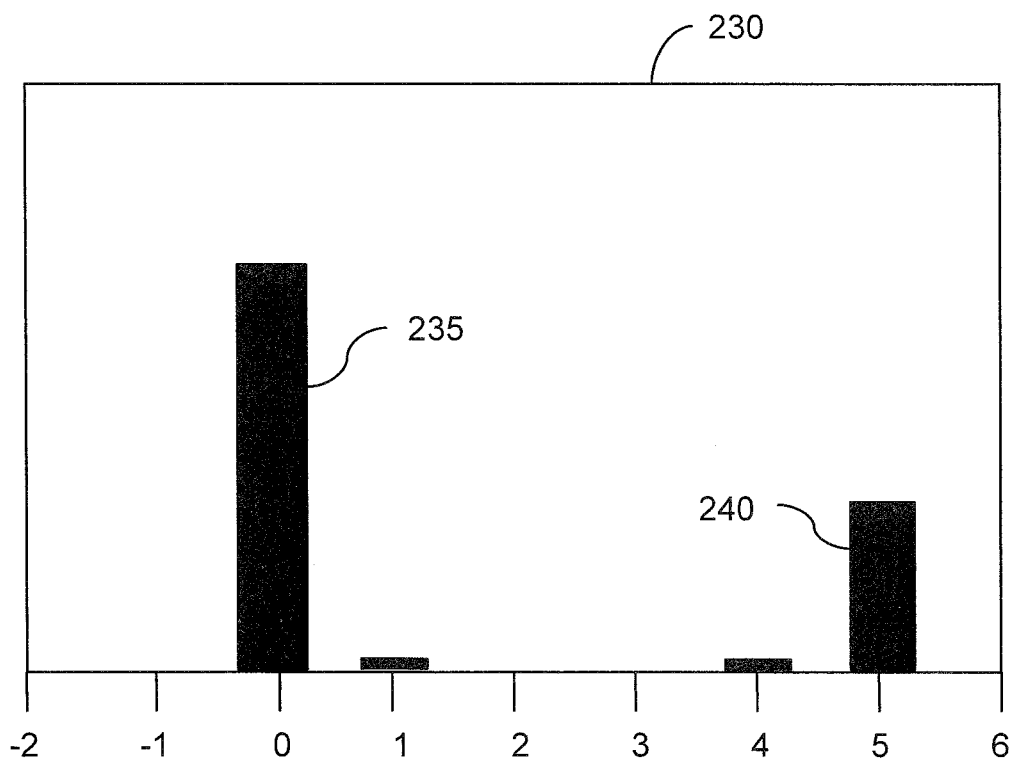
FIG. 2D illustrates an example of a histogram for the motion map of FIG. 2C.

By generating motion vectors for groups of pixel slices throughout the frame, a histogram may be generated that detects the different types of content. For example in the case of motion map 215, a bi-modal histogram 230 (FIG. 2D) might result that includes 2 dominate motion values: value "0" at bar 235 for the no motion region 220 and value "5" at bar 240 for the moving region 225. With this information, the apparatus 100 can determine locations of the different content regions and determine appropriate interpolation ratios to be applied to the video stream by the frame-rate converter 120. For example, the no motion region 220 is determined as being film content, which is to be converted to 24p. The moving region 225 is determined to be video content at 60 hz. If the desired final output stream is 120 hz, then the apparatus 100 sends instructions to the frame-rate converter 120 to perform a 5× interpolation for pixels coming from the film region 220 and to perform a 2× interpolation for pixels coming from the video region 225. Appropriate frames are then generated accordingly.

Figure 3A:
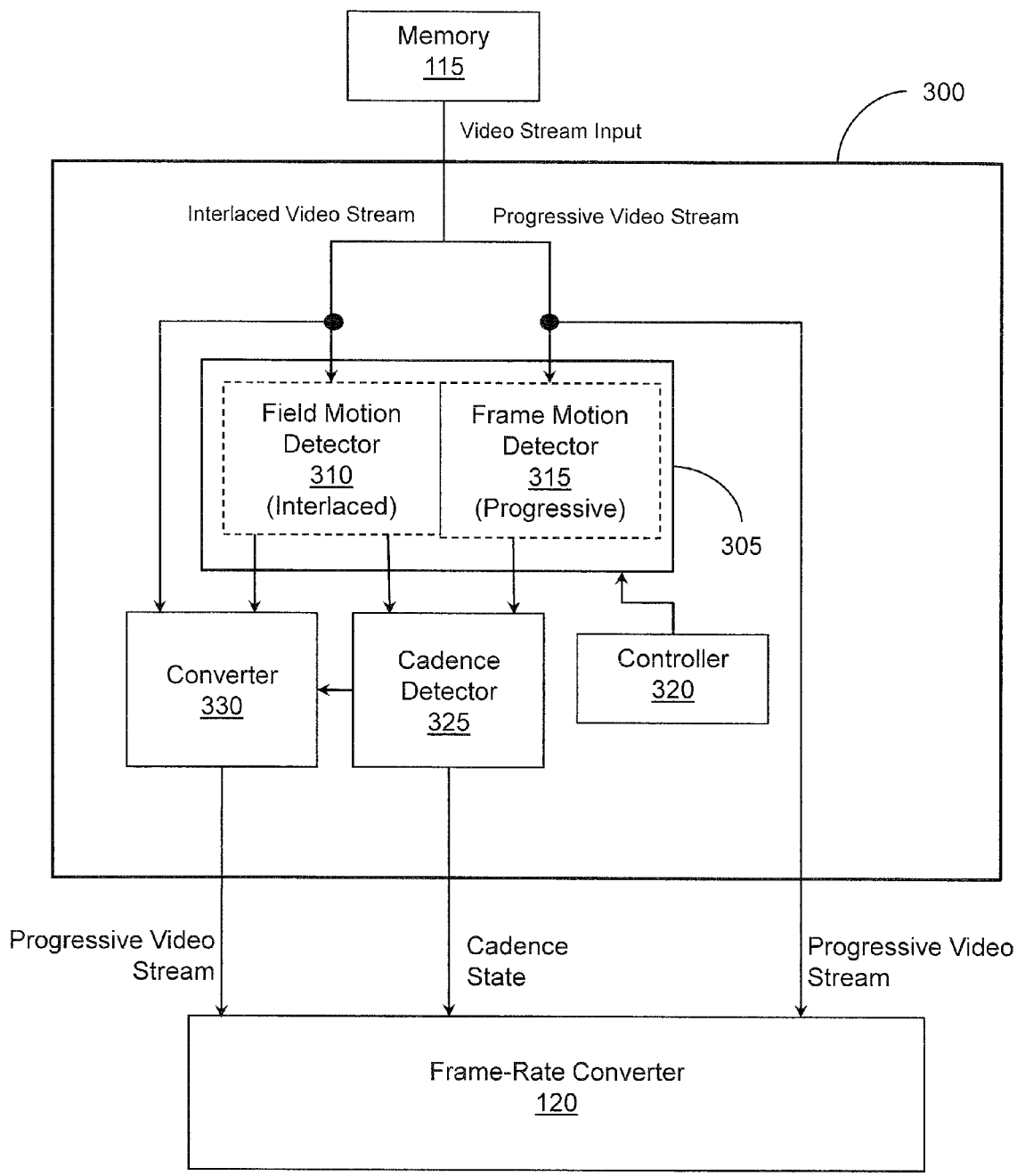
FIG. 3A illustrates one embodiment of a de-interlacer.

FIG. 3A illustrates one embodiment of a de-interlacer 300 that processes both interlaced video streams and progressive video streams. The de-interlacer 300 includes motion detection logic 305 that analyzes an input video stream and determines a pattern of motion. The motion detection logic 305 is changeable to function as two different components: a field motion detector 310 or a frame motion detector 315. In one embodiment, the motion detector logic 305 includes hardware that is at least partially shared between the two functions of the field motion detector 310 and the frame motion detector 315. A controller 320 controls the functionality of motion detection logic 305 according to the type of input video stream. If the input stream is interlaced, the field motion detector 310 is activated. If the input stream is progressive, then the frame motion detector 315 is activated. In one embodiment, being activated includes processing signals from the input video stream through certain components of the motion detection logic 305 to perform field motion detection or frame motion detection. This is described in more detail below.

A cadence detector 325 is implemented similar to the cadence detector 110 in FIG. 1. The cadence detector 325 determines a cadence pattern of the input stream (whether interlaced or progressive) based, at least in part, on the pattern of motion from the motion detection logic 305. When the cadence is determined, cadence information is generated. A converter 330 converts the input video stream to a progressive stream if the input video stream is interlaced. No conversion is needed when the input stream is already in progressive form. The de-interlacer 300 outputs the progressive video stream and the cadence information to the frame-rate converter 120, which is described in FIG. 1.

In the case that the input stream is determined to be an interlaced stream, the field motion detector 310 is activated to process the stream. Although the input path is illustrated in FIG. 3A as two separate paths depending on the type of input stream, it will be appreciated that one input path can be implemented that enters the motion detection logic 305. The internal logic of the motion detection logic 305 is then controlled to process the input stream differently.

For example, for an interlaced stream, the field motion detector 310 determines a pattern of motion between interlaced fields of the interlaced stream. For a progressive stream, the frame motion detector 315 determines the pattern of motion between progressive frames. In one embodiment, the field motion detector 310 and the frame motion detector 315 are implemented to share components and can be on one circuit die. Depending on the type of input stream, the input signals are processed through certain components while other components are by-passed.

To processes the interlaced stream, the de-interlacer 300 detects the cadence by determining motion between interlaced fields and then converts the interlaced video stream to a progressive video stream. Table 2 shows examples of a 60 Hz interlaced stream (60i) and corresponding frame and field motion values. For example, the interlaced fields are accessed from memory elements (e.g. from memory 115). In the logic of the field motion detector 310, three interlaced fields are accessed (e.g. the current field, the previous field, and the next field) using field delay elements and compared in pairs as described below. The configuration of the field motion detector 310 can be implemented in a number of ways and is not shown in detail.

TABLE 2

| 24p | | A | | | B | | | C | | D | E |
|---|---|---|---|---|---|---|---|---|---|---|---|
| 60p | A | A | A | B | B | C | C | C | D | D | E |
| 60i | Ae | Ao | Ae | Bo | Be | Co | Ce | Co | De | Do | Ee |
| Frame Motion | 1 | 0 | 1 | 1 | 1 | 1 | 0 | 1 | 1 | 1 | 1 |
| Field Motion | 0 | 0 | 1 | 0 | 1 | 0 | 0 | 1 | 0 | 1 | 0 |
| Cadence State | 4 | 0 | 1 | 2 | 3 | 4 | 0 | 1 | 2 | 3 | 4 |

In Table 2, "24p" is the original 24 Hz progressive frame stream. The letters "A", "B", "C" and so on represent different frames A, B, C, etc as described previously. "60p" is a 60 Hz progressive frame stream generated from the 24p stream by up-converting using a 3:2 frame repeat. "60i" is an interlaced stream generated from the 60p stream by retaining even pixel lines from the frame in the even fields (while dropping the odd pixel lines), and retaining odd pixel lines from the frame in the odd fields (while dropping the even pixel lines). For example, "Ae" represents frame "A" with only the even pixel lines (e.g. the odd lines are dropped) and "Ao" represents frame A with only the odd pixel lines (e.g. the even lines are dropped). The 60i stream is the video stream that would be input to the de-interlacer 300. The converter 330 generates the original 60p progressive frames by combining the appropriate even/odd fields (e.g. Ae+Ao=A). In one embodiment, the converter 330 includes a motion adaptive de-interlacer circuit that weaves the interlaced fields together based on the cadence pattern to generate a progressive video stream.

With continued reference to Table 2, "frame motion" for the interlaced stream 60i compares the neighboring fields from the 60i stream on either side of the current field. For example if the current field is "Ao", the frame motion value of "0" under the "Ao" field is determined by comparing the field to the left (which is Ae, a previous field) with the field to the right (which is Ae, the next field). A "1" value means the fields are different and a "0" means they are the same. "Field motion" compares every field in the 60i stream with its right neighbor. The frame motion comparison for the interlaced stream as shown in Table 2 is different than the frame motion comparison for the progressive stream as shown in Table 1. Different elements are analyzed and compared to determine motion.

In one embodiment, the frame motion detector 315 is implemented as a sub-set of the field motion detector 310. Thus both detectors can be implemented and share certain hardware components. Additionally, the frame motion detector 315 is made to use less components than the field motion detector since less comparisons are needed and no format conversion from interlaced-to-progressive is performed. In other words, frame detector components are used by both the field and frame detector functions.

Figure 3B:
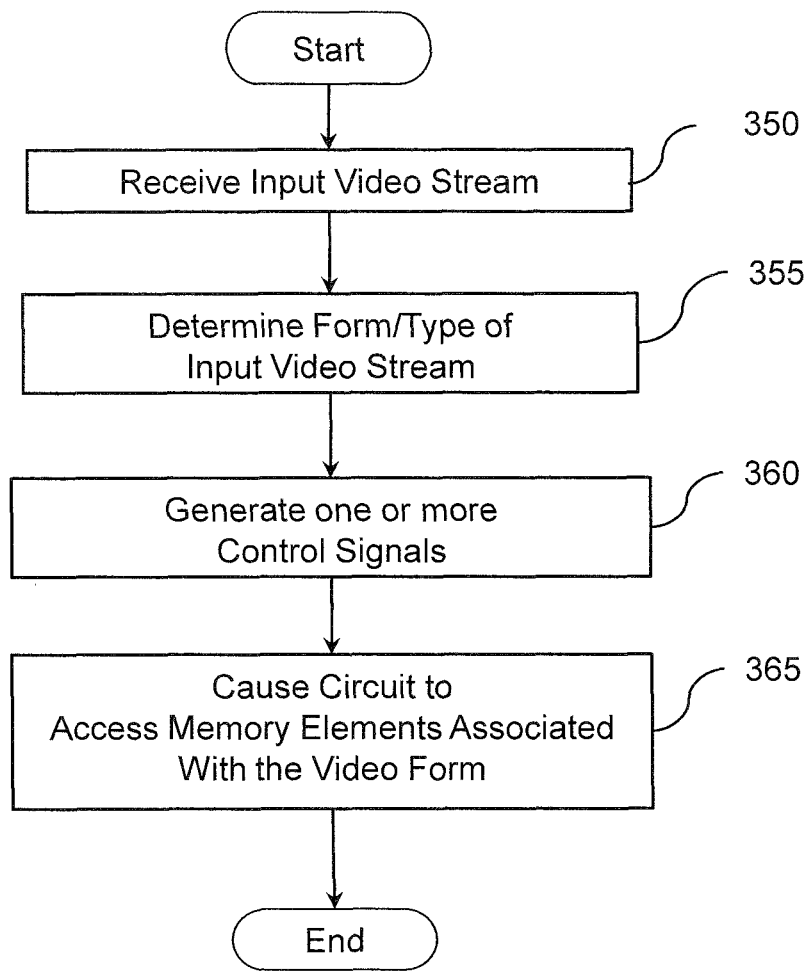
FIG. 3B illustrates one embodiment of a method for controlling the de-interlacer.

For a progressive input stream, the controller 320 causes or configures the motion detection logic 300 to switch from accessing and comparing interlaced fields of the interlaced stream to accessing and comparing adjacent progressive frames from the progressive stream. In one embodiment, different numbers of data delay elements can be used to access different fields or frames. For example, two delay elements are used to separate and access three fields from the input stream or one delay element is used to separate and access two frames from the input stream. This is described further with reference to FIG. 4. One example of a method is shown in FIG. 3B. At 350, an input video stream is received. At 355, the form/type of the video stream is determined. At 360, based on the form, one or more control signals are generated to control portions of the de-interlacer 300. At 365 for example, the motion detection logic 305 is responsive to the one or more control signals and changes which memory elements are accessed from the input video stream so that progressive frames are accessed instead of interlaced fields. Furthermore, the components for converting the interlaced stream to a progressive stream are by-passed. Other components that may be included in the motion detection logic 300 for processing interlaced streams but would be by-passed are a pixel field motion detector and a field motion global accumulator, which determine if there is motion between fields, and a motion adaptive temporal spatial blender that weaves the interlaced fields together based on the cadence pattern and weave direction of the fields to generate the progressive video stream.

Figure 4:
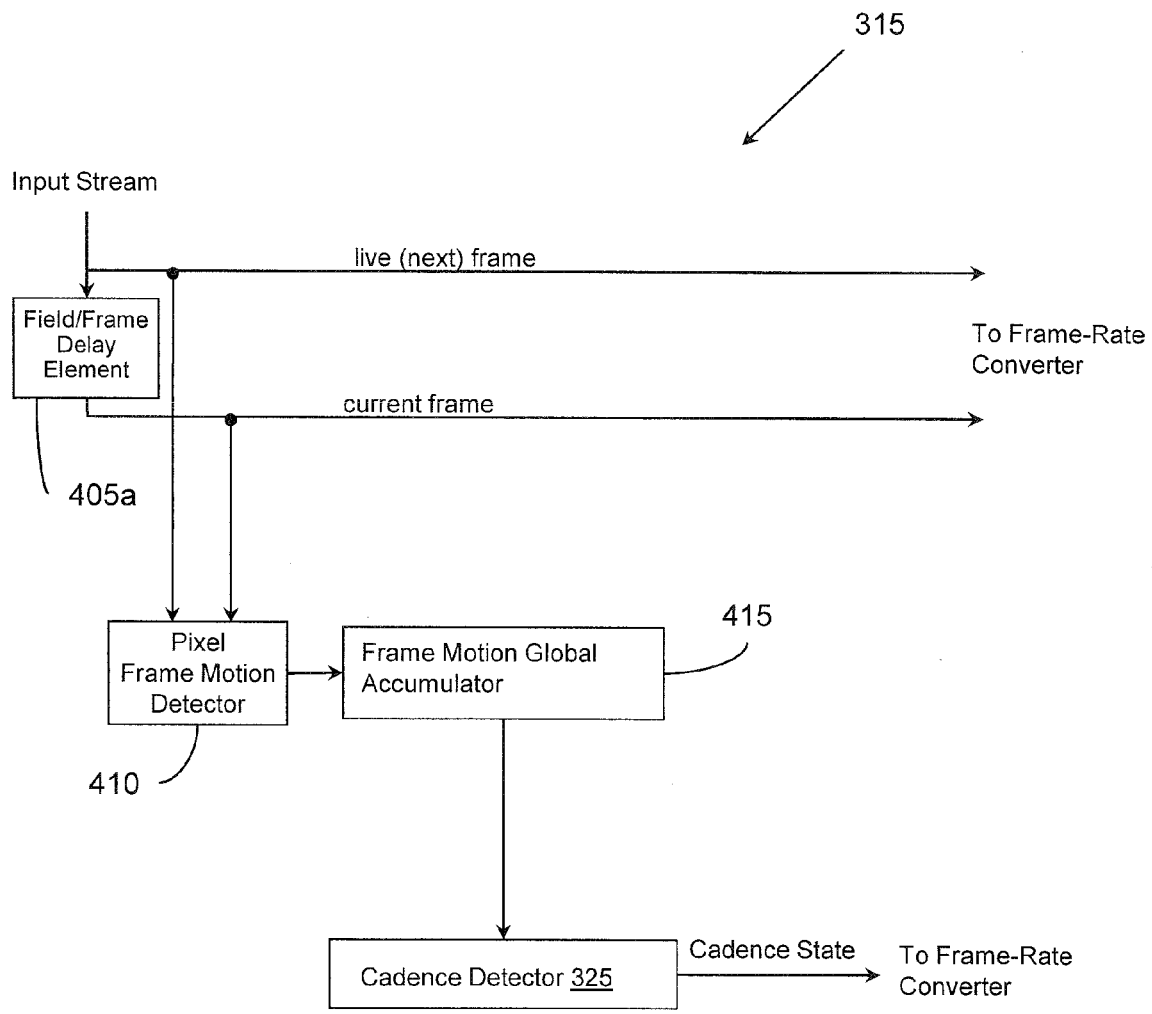
FIG. 4 illustrates one embodiment of a frame motion detector and cadence detector from FIG. 3A.

Illustrated in FIG. 4 is one embodiment of logic for implementing the frame motion detector 315 of FIG. 3A. A field/frame delay element 405 causes a current frame and a live (next) frame to be accessed from the input stream. Although not shown, two field/frame delay elements 405 are included in the hardware and would be used to split the input stream into three fields when the input stream is interlaced. The field signal lines are "live" (next) field, "current" field, and "previous" field. However when processing a progressive video stream, control signals can be used to by-pass the second delay element. Thus only the "live" and "current" signal lines are used, which access the live (next) frame and current frame as shown in FIG. 4. The "previous" field signal line is not illustrated. Thus in one embodiment, configuring the logic to perform either frame motion detection or field motion detection means to control which components are used and which are by-passed for a particular input stream.

The field/frame delay element 405 can be one or more registers, flip-flops, latches, and so on. A pixel frame motion detector 410 compares corresponding pixels from the current frame and next frame to determine motion. A frame motion global accumulator 415 accumulates values representing total motion between frames and outputs a motion value for the frame (e.g. "0" if the frames are the same or "1" if they are different). A sequence of frame motion values is then output to the cadence detector 325 to determine the cadence (e.g. see frame motion values from Table 1). In one embodiment, the cadence detector 325 is programmable to detect a selected cadence pattern from a plurality of cadence patterns. For example, the motion values are matched to a known cadence pattern(s). When a match is found, the cadence is determined. In another embodiment, the pixel frame motion detector 410 and frame motion global accumulator 415 are implemented similar to the frame motion detector 105 shown in FIG. 1.

In another embodiment, to determine whether motion is present between two compared objects (frames or fields), the motion detection logic 305 includes a programmable threshold. The programmable threshold is set to declare when two compared interlaced fields are different or the same, and a different threshold can be set to declare when two compared progressive fields are different or the same. Setting an appropriate threshold for the type of input stream can make the motion determinations more reliable.

For example, the de-interlacer 300 is typically unaware of the source of an interlaced input stream. The interlaced stream may have gone through a number of encoding and decoding processes before arriving at the de-interlacer 300. As a result of multiple encodings/decodings, fields that should be identical are no longer identical (e.g. field Ae is not equal to the next Ae field). Thus when comparing field Ae to another field Ae, the result could indicate some pixel motion between the fields. In this case, the programmable threshold can be set more aggressively to declare more near zero comparisons as the same field. More reliable motion determinations may result, which can increase the reliability of the cadence determination.

Figure 5:
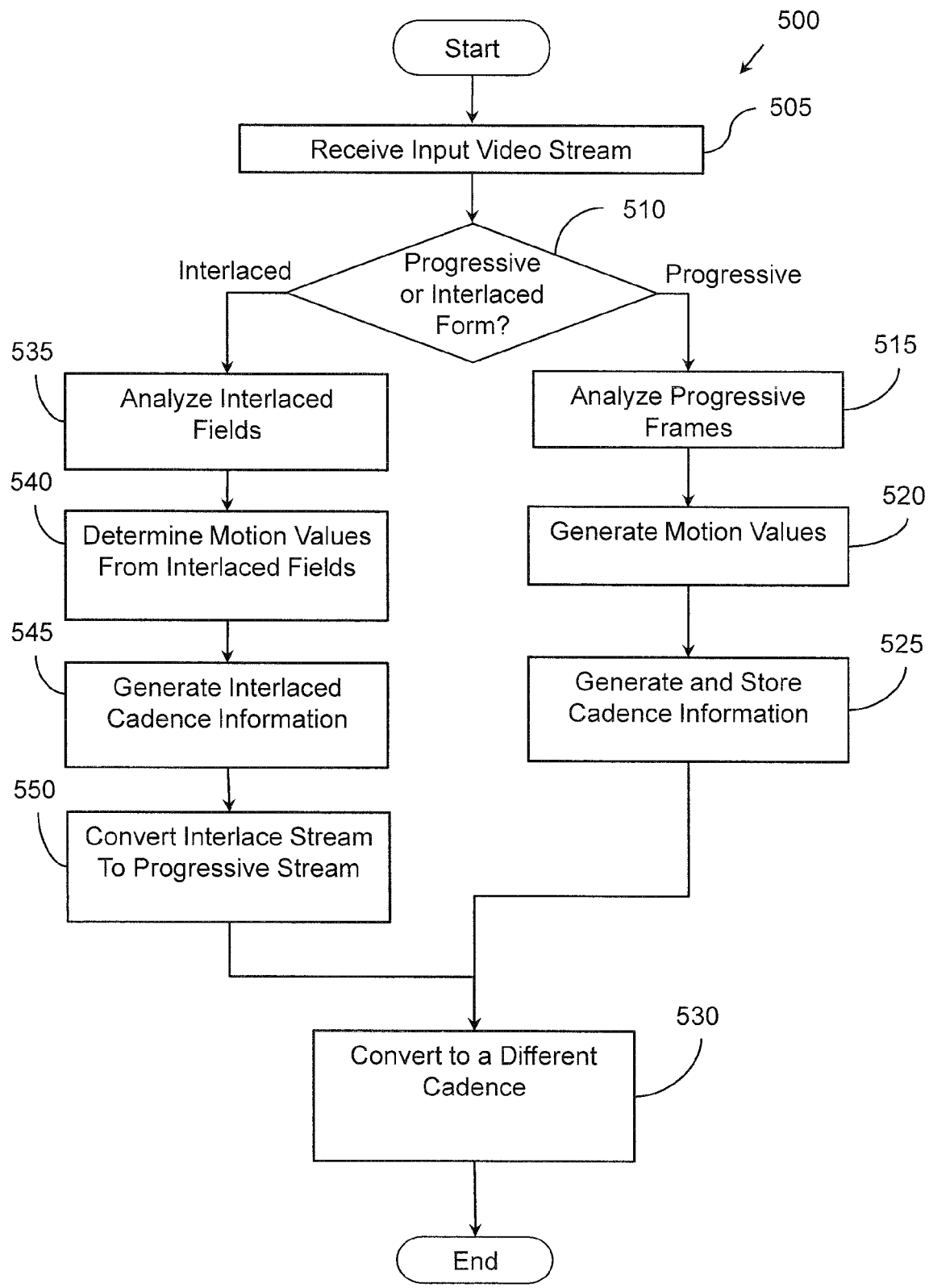
FIG. 5 illustrates one embodiment of a method for detecting cadence.

With reference to FIG. 5, one embodiment of a method 500 is illustrated that shows various aspects of processing an input video stream and determining its cadence. Method 500 generally reflects portions of the functions described in previous embodiments. As such, the specific examples and details of method 500 can be obtained from the previous embodiments.

At 505, the input video stream is received and at 510, the form of the stream is determined. If the input stream is a progressive video stream then, at 515, the progressive video stream is analyzed and adjacent progressive frames are compared. As described in FIG. 3B, one or more control signals can cause the motion detection logic 305 to change which memory elements are accessed from the input video stream so that progressive frames are accessed instead of interlaced fields, which are accessed when the method flows to block 535. At 520, motion values are generated between the adjacent progressive frames for a sequence of frames. At 525, cadence information is generated and stored, which represents a cadence pattern of the progressive video stream determined from the motion values. At 530, the progressive video steam is converted to a stream having a different cadence (e.g. a smooth movie cadence) based, at least in part, on the cadence information.

If at 510 the method determines that the input video stream is interlaced, a de-interlacing process is performed. In one embodiment, the method includes switching a circuit between analyzing the progressive video stream and de-interlacing the interlaced video stream based on the form of the input video stream. At 535, the interlaced fields of the interlaced stream are analyzed. At 540, motion values are determined from the interlaced fields and at 545, cadence information is generated that represents the cadence pattern of the interlaced stream. At 550, once the cadence pattern is determined, the interlaced stream is converted to a de-interlaced progressive stream by combining and weaving appropriate fields. The method then continues to 530 where a different cadence (e.g. a smooth movie cadence) is generated from the progressive stream.

While for purposes of simplicity of explanation, the illustrated methodologies are shown and described as a series of blocks. However, it is to be appreciated that the methodologies are not limited by the order of the blocks, and some blocks can occur in different orders and/or concurrently with other blocks from that shown and described. Moreover, less than all the illustrated blocks may be used to implement a methodology. Blocks may be combined or separated into multiple components. Furthermore, additional and/or alternative methodologies can employ additional, not illustrated blocks.

It will be appreciated that in some embodiments, some or all the methods, devices, or components described herein may be implemented as logic, as computer executable instructions stored on a machine-readable storage medium, as one or more circuits, and so on. The functions may be implemented in a semiconductor chip.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a frame motion detector configured to analyze progressive frames and to determine motion values between the progressive frames;
a cadence detector to determine a cadence pattern from the motion values of the analyzed progressive frames; and
a frame rate converter to convert the cadence pattern of the progressive frames to a different cadence that has a different pull-down ratio.

2. The apparatus of claim 1 where the apparatus is connected to provide the progressive frames and a cadence state sequence to the frame-rate converter, where the cadence state sequences provide instructions for recovering the cadence pattern from the progressive frames.

3. The apparatus of claim 1 where the frame motion detector is configured to identify different types of content within the progressive video stream by:
generating a plurality of slices of pixel groups from a frame and an adjacent frame of the progressive frames;
determining motion vectors between corresponding slices from the adjacent frame;
generating a histogram for each of the plurality of slices that indicates an amount of motion between the adjacent frame and the frame in the corresponding slices using the motion vectors; and
determining that different types of content exist if the histogram is a bi-modal histogram.

4. The apparatus of claim 1 where the apparatus is implemented in a de-interlacer configured to convert an interlaced video stream to a progressive video stream, where the de-interlacer comprises:
a field motion detector to access and compare fields from the interlaced video stream and determine field motion between the fields; and
a controller to configure the field motion detector to function as the frame motion detector by accessing and comparing frames instead of the fields in response to determining that progressive video is input.

5. The apparatus of claim 1 where the frame motion detector is configured to compare a progressive frame with an adjacent progressive frame by:
comparing pixel slices from the progressive frame and the adjacent progressive frame;
determining motion vectors between the pixel slices;
generating a histogram of motion values from the motion vectors; and
generating, based at least in part on the histogram, a frame difference value that indicates whether the progressive frame is different than the adjacent progressive frame.

6. The apparatus of claim 1 wherein the frame-rate converter is configured to convert the cadence pattern of the progressive frames by adding or dropping frames from the progressive frames in a video stream based, at least in part, on a cadence state sequence.

7. A de-interlacer, comprising:
motion detection logic configured to analyze an input video stream and determine a pattern of motion, the motion detection logic being re-configurable between:
determining the pattern of motion between interlaced fields when the input video stream is an interlaced stream; and determining the pattern of motion between progressive frames when the input video stream is a progressive stream;

a cadence detector configured to determine a cadence pattern from the pattern of motion; and a converter for converting the input video stream to have a different cadence having a different type of pull-down, wherein the converting is based at least in part on the cadence pattern.

8. The de-interlacer of claim 7 further comprising a controller configured to control the motion detection logic to function between comparing the interlaced fields of the interlaced stream and comparing the progressive frames from the progressive stream.

9. The de-interlacer of claim 7 where the motion detection logic is responsive to a control signal to change memory elements that are accessed from the input video stream to access the progressive frames instead of the interlaced fields when the input video stream is a progressive stream.

10. The de-interlacer of claim 7 where the frame motion detector is a sub-set of the field motion detector.

11. The de-interlacer of claim 7 where the frame motion detector is configured to analyze the progressive frames by comparing each frame with an adjacent frame and determining whether the frames are different frames.

12. The de-interlacer of claim 7 where the motion detection logic includes a programmable threshold that is set to declare when two compared interlaced field are different and when two compared progressive fields are different, where the programmable threshold is set differently for the interlaced stream than for the progressive stream.

13. The de-interlacer of claim 7 where the de-interlacer is connected to a frame-rate converter that generates the different cadence by adding or dropping frames based, at least in part, on the cadence information.

14. The de-interlacer of claim 7, where the cadence detector is programmable to detect a selected cadence pattern from a plurality of cadence patterns.

15. A method, comprising:

analyzing a progressive video stream and comparing adjacent progressive frames;

generating motion values between the adjacent progressive frames for a sequence of frames;

generating and storing cadence information that represents a cadence pattern of the progressive video stream determined from the motion values; and converting the progressive video steam to a stream having a different cadence that has a different pull-down ratio than the cadence pattern based, at least in part, on the cadence information.

16. The method of claim 15 where prior to the analyzing, the method comprises:

receiving an input video stream;

determining if the input video stream is an interlaced stream or the progressive video stream;

if the interlaced stream is determined, then:

determining field motion from interlaced fields of the interlaced stream;

generating and storing cadence information that represents a cadence pattern of the interlaced stream determined from the motion values; and converting the interlace stream to a de-interlaced progressive stream based, at least in part, on the cadence pattern.

17. The method of claim 15 further comprising:

generating the different cadence from the progressive video stream by adding or dropping progressive frames based, at least in part, on the cadence information.

18. The method of claim 15 where generating the motion values comprises:

comparing pixel slices from the adjacent progressive frames;

determining motion vectors between the pixel slices;

generating a histogram of motion values from the motion vectors; and generating, based at least in part on the histogram, a frame difference value that indicates whether the adjacent progressive frames are different.

19. The method of claim 15 where converting the progressive video stream to the stream having the different cadence includes generating the stream to have a uniform number of repeating frames.

20. The method of claim 15 further comprising:

receiving an input video stream that is in a form of the progressive video stream or an interlaced video stream;

switching a circuit between analyzing the progressive video stream and de-interlacing the interlaced video stream based on the form of the input video stream.

* * * * *